United States Patent
Szonye et al.

(10) Patent No.: US 7,930,486 B2
(45) Date of Patent: Apr. 19, 2011

(54) CACHE CHUNKED LIST CONCRETE DATA TYPE

(75) Inventors: Bradd W. Szonye, San Jose, CA (US); William Pohl, Morgan Hill, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 689 days.

(21) Appl. No.: 11/799,303

(22) Filed: Apr. 30, 2007

(65) Prior Publication Data

US 2008/0270687 A1 Oct. 30, 2008

(51) Int. Cl.
*G06F 12/00* (2006.01)
(52) U.S. Cl. .................. 711/137; 711/E12.069
(58) Field of Classification Search ........... 711/118, 711/137
See application file for complete search history.

(56) References Cited

U.S. PATENT DOCUMENTS 6,112,280 A * 8/2000 Shah et al. ............... 711/129
6,233,602 B1 * 5/2001 Van Venrooy et al. ....... 709/203

OTHER PUBLICATIONS

"Virtual Cache Line: A New Technique to Improve Cache Exploitation for Data Structures" by S. Rubin, et al. IBM Research Lab in Haifa, Israel. Retrieved from the internet: http://www.cs.wisc.edu/~shai/CC99.pdf. Total pages 15, Mar. 1999.

* cited by examiner

*Primary Examiner* — Reginald G Bragdon
*Assistant Examiner* — Hamdy S Ahmed

(57) ABSTRACT

An embodiment of the invention provides a concrete data type and a method for providing a cached chunked list concrete data type. The method can perform steps including: storing at least one datum in a chunk in a cache line; and setting a lower bit value (LB) in a link/space pointer in the chunk to indicate the empty slots in the chunk.

21 Claims, 4 Drawing Sheets

CACHE CHUNKED LIST CONCRETE DATA TYPE

TECHNICAL FIELD

Embodiments of the invention relate generally to a cache chunked list concrete data type.

BACKGROUND

In current computers, when the processor wishes to read from or write to a location in the main memory, the processor first checks whether that memory location is in a cache. This is accomplished by comparing the address of the memory location to all tags in the cache that might contain that address. If the processor finds that the memory location is in the cache, then a "cache hit" has occurred, and the processor immediately reads or writes the data in the cache line. If the memory location is not in the cache, then a "cache miss" has occurred. Cache misses lead to memory latency because the cache misses require the data to be transferred from the main memory. This transfer incurs a delay since the main memory is much slower than the cache memory, and also incurs the overhead for recording the new data in the cache before the new data is delivered to the processor. The proportion of accesses that results in a cache hit is known as the "hit rate", and is a measure of the effectiveness of the cache. As CPUs become faster, stalls (i.e., memory latency) due to cache misses displace more potential computation.

Linked list have been used in attempts to reduce the memory latencies. Singly-linked lists require one link per data element (i.e., list node), and list nodes may be widely scattered in memory. Also, the cache misses occur in a sequential manner because of the sequential access that is performed on the data elements in the link list. These sequential cache misses contributes to the memory latency problem. Together, these result in poor cache performance.

Arrays also have been used and may provide excellent cache density, and they also permit traversal via simple pointer arithmetic. However, insertion and deletion operations are very expensive for arrays, making them unsuitable for many queue and stack implementations. The problem with arrays is with regard to static allocation. It is extremely difficult and costly to grow or shrink the arrays. This makes them impractical for long-lived unbounded lists.

Another solution is described in, "Virtual Cache Line: A New Technique to Improve Cache Exploitation for Recursive Data Structures", (IBM Research LAB in Haifa and Israel Institute of Technology, 1999) by Shai Rubin, David Bernstein, and Michael Rodeh. This solution uses a Virtual Cache Line allocation of linked data nodes in clusters to improve cache performance. Although this solution may improve data locality (data proximity in memory), this solution does not reduce the high meta-data overhead within the data nodes. The high memory footprint for data allocated with this VCL technique would result in poorer cache performance because less cache space is available for data storage. Furthermore, this VCL technique requires sophisticated insertion and deletion algorithms to fill the cache lines efficiently.

The C++ standard library uses a chunked-list implementation of double-ended queues, combining the fast traversal advantages of arrays with the dynamic-update advantages of linked data structures. However, the underlying CDT (C/C++ Development Toolkit) only permits insertions and deletions at the ends of the list and does not permit arbitrary updates in the middle of the list. Also, this C++ deque (double-ended queue) does not optimize its chunks for cache performance. A data element and its meta-data may reside in two different cache lines, increasing memory pressure. Finally, this C++ deque does not address a cache prefetching feature.

Therefore, the current technology is limited in its capabilities and suffers from at least the above constraints and deficiencies.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

Figure 1:
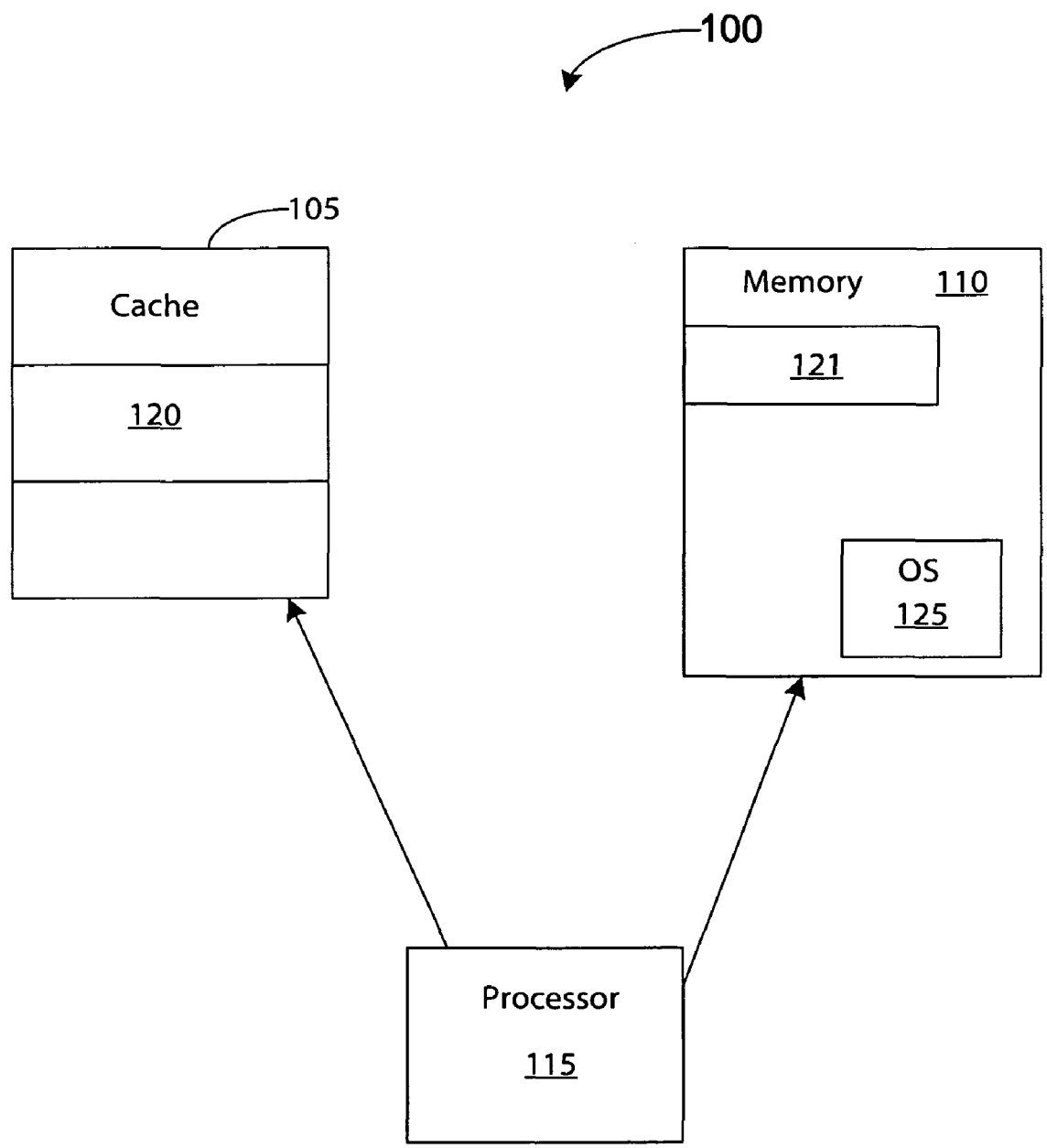
FIG. 1 is a block diagram of an apparatus (system) that can be used in an embodiment of the invention.

FIG. 1 is a block diagram of a system (apparatus) 100 in accordance with an embodiment of the invention. The system 100 is typically a computer system that is in a computing device. The cache 105 is typically a smaller, faster memory which stores copies of the data from locations (addresses) 121 in the main memory 110. These data copies are typically data in the frequently used locations 121 in the main memory 110. When a processor 115 wishes to read from or write to a location 121 in the main memory 110, the processor 115 will first check whether that memory location 121 is in the cache 105. As long as most memory accesses of the processor 115 are to cached memory locations 120 in the cache 105, the average latency of memory accesses will be closer to the cache 105 latency than to the latency of main memory 110.

As discussed in detail below, the cache 105 stores a cache-chunked list which is a concrete data type that optimizes cache usage for sequential data such as, for example, lists, stacks, and queues.

Figure 2:
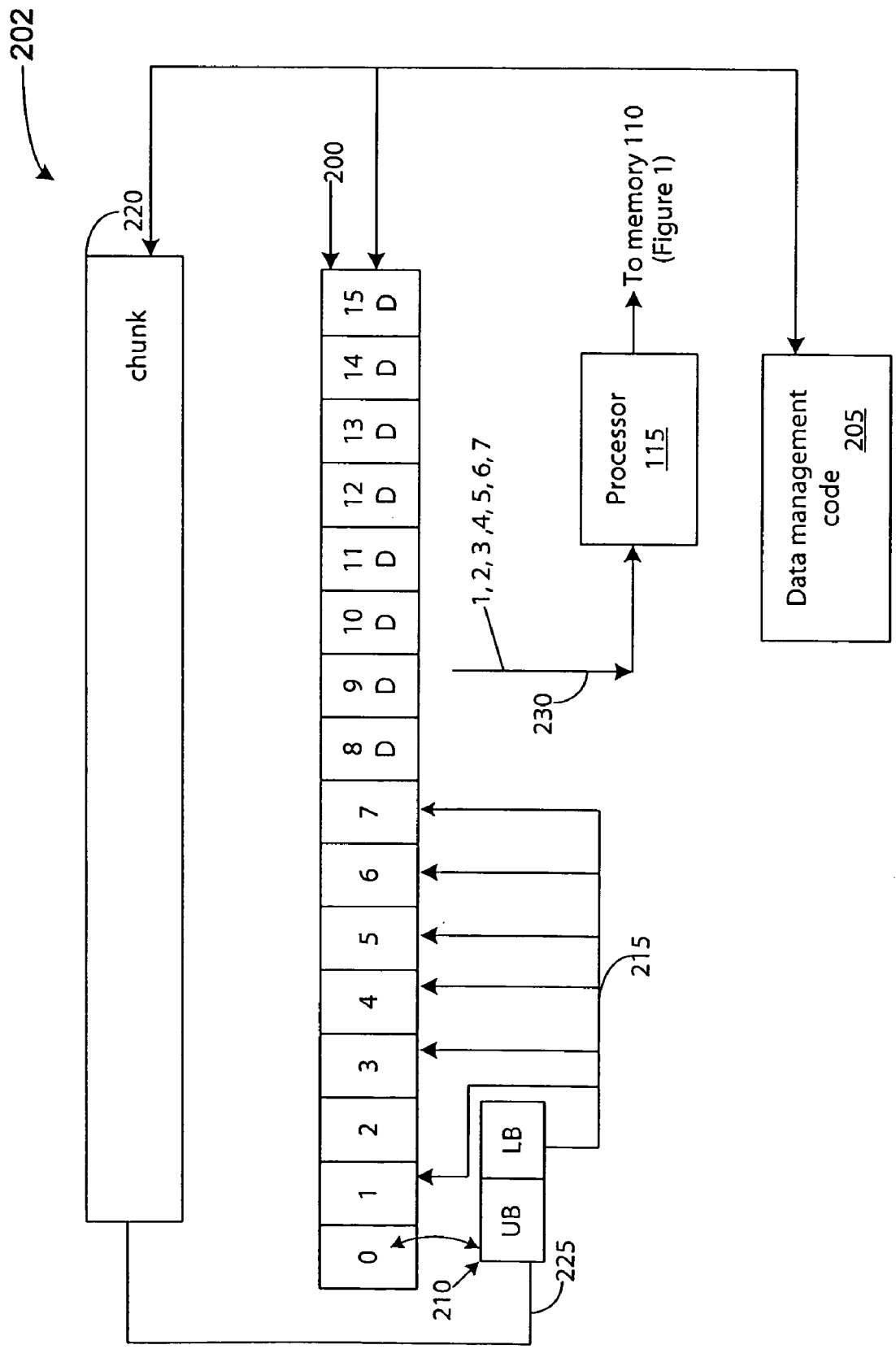
FIG. 2 is a block diagram that shows details of an embodiment of the invention.

FIG. 2 is a block diagram of a chunk 200 in accordance with an embodiment of the invention. The chunk 200 is stored in the cache 105. The elements in FIG. 2 is a representation of an abstract data type (ADT) 202 which is a type of data abstraction where a data abstraction type's internal form is hidden behind a set of access functions. Values of the type are created and inspected only by calls to the access functions. This allows the implementation of the type to be changed without requiring any changes outside the module in which it is defined. A classic example of an ADT is a stack data type for which functions might be provided to create an empty stack, to push values onto a stack and to pop values from a stack.

In the example of FIG. 2, the chunk 200 is formed by slots 0 through 15. The number of slots in a chunk and the size of each slot may vary. The size of a slot will depend on hardware architecture and operating system type that is used in the system 100. A chunk 200 has the same size as a cache line in the cache 105 and has the same memory alignment as the cache line. As an example, for an operating system (OS) 125 (FIG. 1) that is a 64-bit version, the chunk 200 is typically 128 bytes and each pointer for each slot is typically 8 bytes. Therefore, if the OS 125 is a 64-bit OS, then the chunk 200 will have 16 slots (slots 0 through 15) at 8 bytes (64 bits) each. In determining the chunk size, the cache line size is divided by the pointer size. For a 128 byte cache line with 8 byte (64 bit) pointers, there will be 16 slots. For a 128 byte cache line with 4 byte pointers there will be 32 slots. Also, in the embodiments of the invention that are discussed herein, it is assumed that the chunks are cached aligned (i.e., a chunk is aligned with a cache line). Note further that as computer technology advances, the sizes of chunks and slots and the number of slots in a chunk may potentially increase. In contrast, for an OS 125 that is a 32-bit version, each pointer for each slot is typically 4 bytes. For a 128 bytes cache line, there will be 32 slots in a chunk. The data management code 205 can place datum D into or removed datum D from a slot.

In an embodiment of the invention, slot 0 will contain a link/space pointer 210 that indicates the empty slots and the slots that contain data in the chunk 200, and also points to a chunk 220 (if any) that is linked to the chunk 200, as discussed further below. Alternatively, end slot 15 may instead be used to store the link/space pointer 210 in other implementations of embodiments of the invention. The link/space pointer 210 in slot 0 will contain values in the lower bits (LB) that indicate the empty slots in the chunk 200. If the pointer 210 is, e.g., a 64 bits pointer (8 bytes), then the lower bits (LB) may be the lower 4 bits of the 64 bits of pointer 210. As an example, if LB=7, then this "7" bit value indicates that slots 1 through 7 are empty slots. If LB=8, then the "8" bit value indicates that slots 1 through 8 are empty slots. In an alternative embodiment, if LB=7, then slots 7-15 will be the empty slots. Therefore, the LB value is a pointer 215 to the empty slots and therefore will also indirectly identify the non-empty slots. Since a chunk 200 is also equal in size to a cache line 120 in cache 105, there are sufficient always-zero bits to store the number of empty slots, even if the slots are only one byte wide.

The upper bits (UB) may be the upper 60 bits of the 64-bit pointer 210. These upper bits (UB) has the address bit value of another chunk 220 (if any) that is linked to the chunk 200. This address bit value of the chunk 220 is the cache line location of chunk 220 in the cache 105. Therefore, the upper bits (UB) provides the pointer 225 that links the chunk 220 to the chunk 200. To achieve a faster lookup of the address value in the upper bits (UB), slot 0 may optionally contain a bitwise AND of the link/space pointer 225. As known to those skilled in the art, the bitwise AND will mask the portions of bit values that are not of interest, for purposes of faster lookup computation.

In the example of FIG. 2, the non-empty slots 8 through 15 would each contain a datum D. The datum D could be, for example, data that can fit within a slot or can be a pointer to a data structure. The processor 115 (FIG. 1) will be able to read or write to these data D in the non-empty slots.

By placing the data elements D in a single chunk 200, the meta-data overhead in the cache of previous linked lists are avoided. Note that the previous linked lists would have a pointer and data in each element in a list, and the pointer would link together two elements. In previous linked lists, a singly linked list would require 15 pointers for 15 link elements, and 30 pointers (2 pointers per link element) for a doubly-linked list, resulting in significant memory overhead in the cache.

Since the lower bits (LB) in the link/space pointer 210 will identify the empty slots (e.g., empty slots 1 through 7 in the example of FIG. 1), the processor 115 can perform a prefetch 230 for the empty slots 1-7. The prefetching operation 230 permits the processor 115 to read from or write to the main memory locations 121 that are mapped to the empty slots 1-7. The use of the link/space pointer 210 reduces the memory latencies of previous methods, by avoiding the sequential cache misses that occur in the previous methods. In other words, the processor 115 can identify the empty slots 1-7 in parallel, by reading the value of LB in the link/space pointer 210 and the perform the prefetching operation 230 for accessing the main memory 110 for the missing data D in the empty slots 1-7. It should be noted that prefetch instructions should not stall or block (hence allowing the processor to keep on performing the processing steps).

Figure 3:
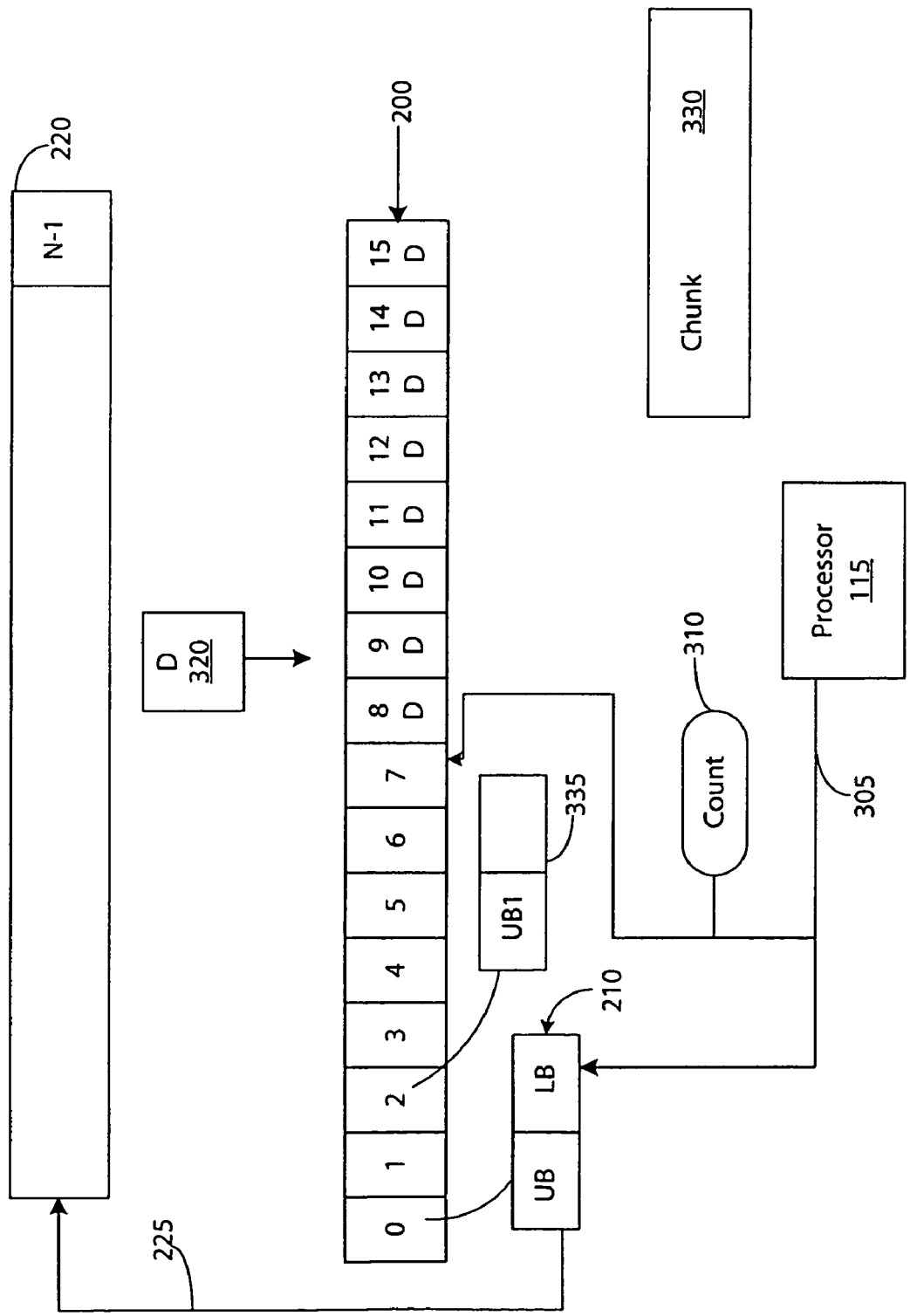
FIG. 3 is a block diagram that shows various features that can be used in an embodiment of the invention.

FIG. 3 is a block diagram that illustrates the traversal of slots in a data chunk 200, in an embodiment of the invention. The processor 115 executes a traversal routine 305 in order to access (read or write) the slots 0 through 15. The traversal routine 305 accesses any particular slot based on a count value 310 that points to a particular slot. Each count value 310 corresponds to a particular slot. For example, slot 0 can correspond to a count value 310 that equals the bit value "0000". To traverse from slot 0 to slot 15, the traversal routine 305 will increment the count value 310 to point to the particular slots. The traversal routine 305 can detect the end of the chunk 200 (i.e., slot 15 in FIG. 3) if the count value 310 matches an offset value that corresponds to slot 15.

To insert data into the chunk 200, the data is inserted into the last empty slot of the first chunk 200. For example, in FIG. 3, if LB=7, which indicates that slots 1-7 are empty, then the routine 306 inserts the datum 320 into the slot 7 by reading of the LB=7 value. The slot 7 is identified as the last empty slot based on the LB value.

To insert a datum 320 in the middle of the list, a slot is made empty by shifting earlier data one slot lower in the chunk 200. For example, in FIG. 3, if the routine 305 will insert the datum 320 into slot 8 which is not empty, then the routine 350 will first shift the datum D in the slot 8 into the next empty lower slot 7, and will then insert datum 320 into slot 8. If there is no more empty slots in chunk 200, then routine 305 allocates and links a new chunk 220 to chunk 200, by setting the pointer 225 in upper bits UB as described above). The routine 305 can then store datum 320 to slot N-1 which is an end slot in the chunk 220.

If there are no more empty slots in chunk 200, then routine 305 will link 225 the chunk 200 to a new chunk 220. The routine 305 can then allocate datum D in one or more slots in chunk 200 to chunk 220, so that an empty slot in chunk 200 becomes available to store the datum 320.

If slot 15 in chunk 200 is the only non-empty slot in the chunk, and the datum D in slot 15 is to be deleted, then the routine 305 can delete the datum D in slot 15. The routine 305 will then set LB to the LB=15 value. Whenever a datum D is deleted in a slot, the routine 305 will increment the LB value to indicate the new empty slot. To delete a datum D from the middle of the list, the routine 305 shifts an earlier datum D at one slot higher in the chunk 200 so that the empty slot between non-empty slots in the chunk is filled with datum D.

If a chunk 220 is completely empty, then the routine 305 can unlink and deallocate the chunk 220 by deleting the pointer 225 in the UB value. The routine 305 may run a deletion algorithm to deallocate any adjacent chunk if the data in the adjacent chunk will fit into available empty slots in the chunk 200.

The chunk 200 could also be doubly-linked (i.e., linked to two chunks). In the example of FIG. 3, a backward pointer 335 will have upper bits UB1 that links the chunk 200 to the chunk 330.

Various steps that are shown in FIG. 3 are optimization steps that can be omitted in an embodiment of the invention.

Figure 4:
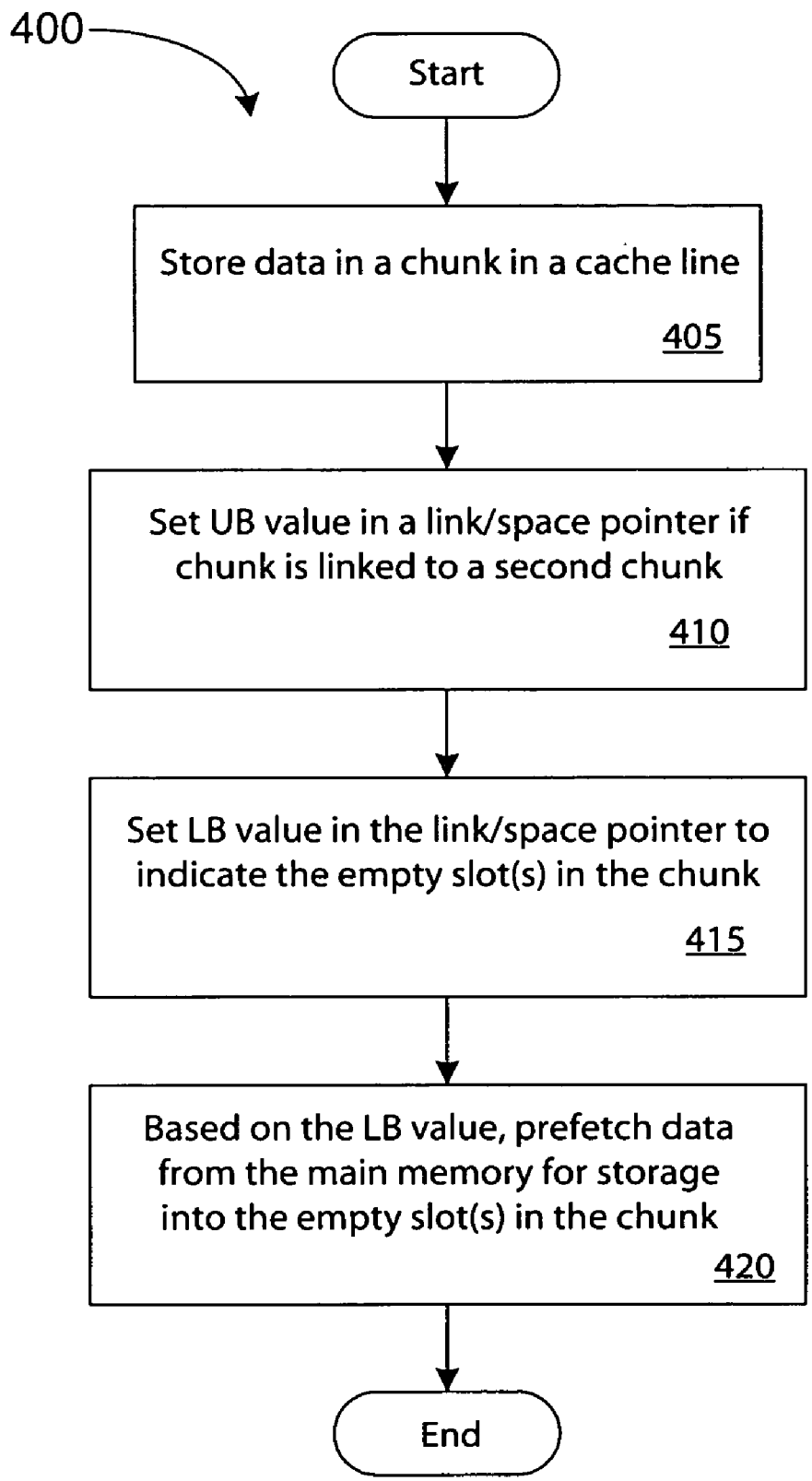
FIG. 4 is a flow diagram of a method in accordance with an embodiment of the invention.

FIG. 4 is a flow diagram of a method 400 in accordance with an embodiment of the invention. In block 405, datum is stored in a slot (or data are stored in slots) in a chunk in a cache line. A datum is stored in an empty slot in the chunk.

Blocks 410 and 415 can be performed in different orders or sequences. In block 410, an upper bit value (UB) is set in a link/space pointer 210 in a slot in the chunk. The UB value is a pointer to another chunk (if any) that is linked to the chunk with the pointer 210.

In block 415, a lower bit value (LB) is set in the pointer 210. The LB value will indicate the empty slots in the chunk.

In block 420, based on the LB value, the empty slots are identified, and the processor can prefetch data from the main memory for storage into the empty slot(s) in the chunk.

Various optimization steps that are shown in FIG. 3 may also be optionally performed in the method 400.

It is also within the scope of the present invention to implement a program or code that can be stored in a machine-readable or computer-readable medium to permit a computer to perform any of the inventive techniques described above, or a program or code that can be stored in an article of manufacture that includes a computer readable medium on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for providing a cached chunked list concrete data type, the method comprising:
storing at least one datum in a chunk in a cache line; and
setting a lower bit value (LB) in a link/space pointer in the chunk to indicate the empty slots in the chunk.

2. The method of claim 1, further comprising:
setting an upper bit value (UB) in the link/space pointer to link another chunk to the chunk.

3. The method of claim 1, further comprising:
based on the LB value, identifying the empty slots; and
prefetching data from a main memory for storage into the empty slots in the chunk.

4. The method of claim 1, further comprising:
traversing slots in the chunk by incrementing a count value.

5. The method of claim 1, further comprising:
inserting datum in a last empty slot in the chunk.

6. The method of claim 5, wherein the LB value identifies the last empty slot in the chunk.

7. The method of claim 1, further comprising:
shifting datum in a slot into a next lower empty slot; and
inserting a new datum into the slot.

8. The method of claim 1, further comprising:
linking the chunk to a new chunk; and
inserting datum into the new chunk if there are no empty slots in the chunk.

9. The method of claim 1, further comprising:
unlinking an empty chunk from an Abstract Data Type (ADT).

10. The method of claim 1, further comprising:
linking the chunk in an Abstract Data Type to a second chunk and to a third chunk.

11. A cached chunked list concrete data type, comprising:
a chunk aligned in a cache line and storing at least one datum, wherein a lower bit value (LB) in a link/space pointer in the chunk indicates the empty slots in the chunk.

12. The cached chunked list concrete data type of claim 11, wherein an upper bit value (UB) in the link/space pointer links another chunk to the chunk.

13. The cached chunked list concrete data type of claim 11 wherein based on the LB value, empty slots are identified and data is prefetched from a main memory for storage into the empty slots in the chunk.

14. The cached chunked list concrete data type of claim 11, wherein slots are traversed in slots in the chunk by incrementing a count value.

15. The cached chunked list concrete data type of claim 11, wherein datum is inserted in a last empty slot in the chunk.

16. The cached chunked list concrete data type of claim 15, wherein the LB value identifies the last empty slot in the chunk.

17. The cached chunked list concrete data type of claim 11, wherein datum is shifted in a slot into a next lower empty slot, and new datum is inserted into the slot.

18. The cached chunked list concrete data type of claim 11, wherein the chunk is linked to a new chunk; and datum is inserted into the new chunk if there are no empty slots in the chunk.

19. The cached chunked list concrete data type of claim 11, wherein an empty chunk is unlinked from an Abstract Data Type (ADT).

20. The cached chunked list concrete data type of claim 11, wherein the chunk is linked in an Abstract Data Type to a second chunk and to a third chunk.

21. An apparatus for providing a cached chunked list concrete data type, the apparatus comprising:
means for storing at least one datum in a chunk in a cache line; and
means for setting a lower bit value (LB) in a link/space pointer in the chunk to indicate the empty slots in the chunk.

* * * * *